United States Patent [19]

Reed

[11] 4,230,278

[45] Oct. 28, 1980

[54] APPARATUS FOR REDUCING HYDROCARBON FUEL REQUIREMENT FOR HABER AMMONIA SYNTHESIS

[75] Inventor: Robert D. Reed, Tulsa, Okla.

[73] Assignee: John Zink Company, Tulsa, Okla.

[21] Appl. No.: 953,486

[22] Filed: Oct. 23, 1978

[51] Int. Cl.³ .......................... B05B 7/06; C01C 1/04
[52] U.S. Cl. .................................. 239/427.5; 239/428; 239/431; 239/432; 422/148; 422/310
[58] Field of Search .............. 422/148, 151, 156, 157, 422/158, 194, 207, 310; 239/428, 430, 431, 432, 434, 427.5

[56] References Cited

U.S. PATENT DOCUMENTS

| 3,203,767 | 8/1965 | Middlebrooks | 422/158 |
| 4,106,912 | 8/1978 | Dollinger et al. | 422/151 |

FOREIGN PATENT DOCUMENTS 2014640  4/1970  France .
2330865 11/1976  France .

*Primary Examiner*—Michael S. Marcus

*Attorney, Agent, or Firm*—Head & Johnson

[57] ABSTRACT

An apparatus for reducing hydrocarbon fuel requirements for Haber Ammonia Synthesis by the supply of selected gases to the second reformer of such system, comprising a first cylindrical conduit, a second smaller coaxial cylinder inside of the first conduit, forming a first annular space therebetween, the downstream end of said second conduit closed, and a plurality of circumferentially-spaced orifices in the wall of said conduit upstream of the closed end. Means to supply air at selected pressure P1, temperature and flow rate to the first annular space, means to supply at least methane at a pressure P2 greater than P1, to said second conduit, so that the concentration of methane in the air will be less than the lower explosive limit, and means to shield the jets of gas from the orifices in the second conduit, as they flow radially outwardly across the annular space. Means are also provided for adding steam in selected ratio with the methane prior to flow into the second conduit, whereby air, methane and steam are mixed together prior to flow into the second Haber reformer.

4 Claims, 6 Drawing Figures

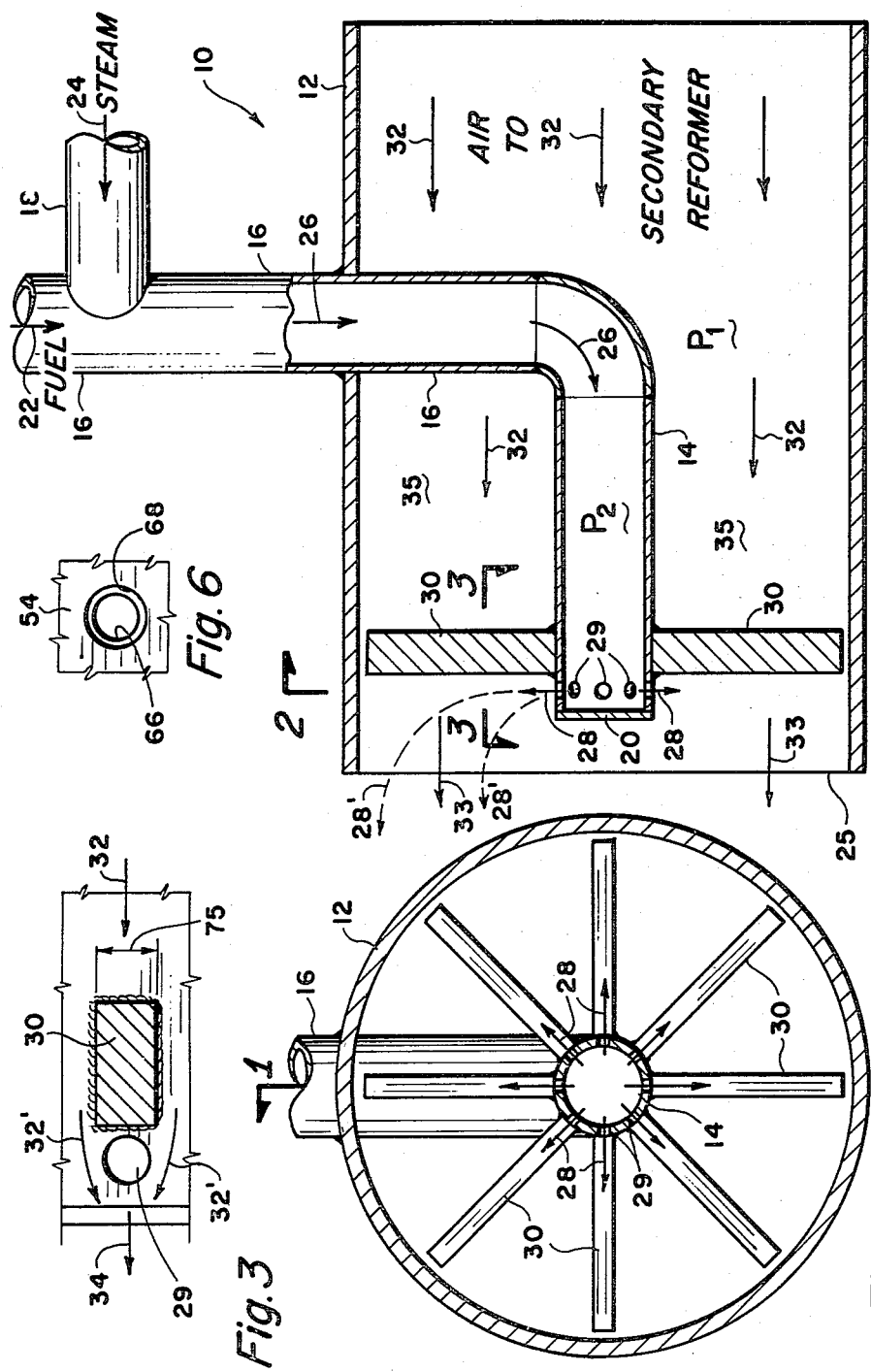

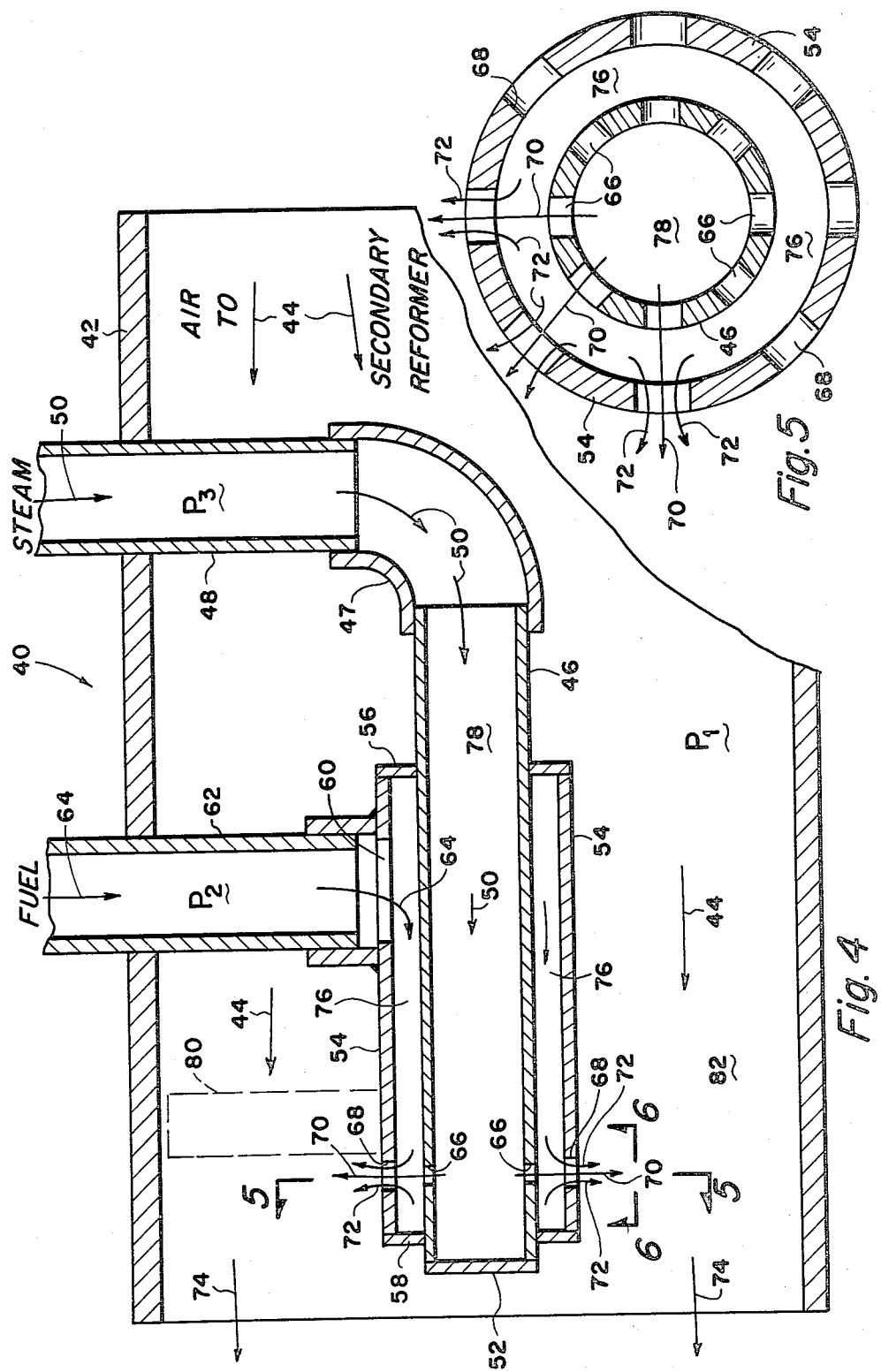

APPARATUS FOR REDUCING HYDROCARBON FUEL REQUIREMENT FOR HABER AMMONIA SYNTHESIS

BACKGROUND OF THE INVENTION

1. Field of the Invention

This invention lies in the field of HABER ammonia synthesis apparatus. More particularly, it concerns the design of an improved means for supplying gases to the second reformer of a classical HABER ammonia synthesis apparatus. Still more particularly, it concerns the design of a conduit system for thoroughly mixing a combustible fuel, such as methane or natural gas, and steam in selected ratio with a major supply of air, all at selected temperature and pressure, prior to flow into the second reformer of a HABER ammonia system, to react therein with the hot products of combustion with the first reformer.

2. Background and Description of the Prior Art

The HABER process, which catalytically combines nitrogen and hydrogen for ammonia ($NH_3$) synthesis is well-known in the chemical industry. Feed preparation for the HABER process must make both nitrogen and hydrogen in 1-3 volume ratio, respectively, available prior to synthesis.

Hydrogen is available, because of primary reforming, to catalytically combine hydrocarbon ($CH_4$ preferably) with $H_2O$ as $CH_4 + H_2O = CO + 3H_2$, and the CO is later reacted to $CO_2 + H_2$ prior to synthesis, followed by $CO_2$ removal, leaving only $H_2$ for synthesis.

The $N_2$ becomes available in a secondary reformer when a selected quantity of air (78.05% $N_2$ + 20.95% $O_2$) is injected into the 1,500F gaseous effluent from the primary reformer which contains CO and $H_2$. Because of the presence of $O_2$, a portion of the CO and $H_2$ burns to increase the gas temperature to the vicinity of 2,000F. Gases at 2,000F then pass into a second catalyst bed for conversion of any residual $CH_4$ to $CO_2$ and $H_2$. There is a further processing prior to ammonia synthesis so that essentially $N_2 + 3H_2$ proceed to synthesis. Thus, the secondary reforming air injection does two things: first, supplies $N_2$, and second, elevates temperature due to burning as the $O_2$ of the air encounters fuels which are significantly above fuel ignition temperature.

The burning of fuels is only partial for the total CO and $H_2$ contents of the primary reformer effluent gases. Thus, it is required for the secondary reforming reactions via catalysis to convert residual methane or natural gas ($CH_4$) to $CO_2 + 2H_2$. However, this means for temperature elevation in the secondary reformer is wasteful of fuel. It is wasteful because, for each mol of methane or natural gas, which is reacted with water vapor to form CO and $H_2$, fuels must be supplied to the primary reformer burners for the endothermal heat of reaction for $CH_4 + H_2O = CO + 3H_2$ or 89,021 btu/mol of methane, which fuels are subsequently partially burned in the secondary reformer as $CO + 3H_2$ (Gas Engineer's Handbook, McGraw-Hill, First Edition, Seventh Impression). This means that, for each 1,000,000 btus of secondary reformer heat, there must be fuel burned to supply $1,000,000 + (2.907 \times 89,021) = 1,258,000$ btus, which is 1.258 × what it should be if methane, per se, could be used as secondary reformer fuel to replace the CO and $H_2$ fuels burned, as the HABER process is now operated for ammonia synthesis in the chemical industry.

As has been discussed, each secondary reformer is equipped with air injection means to which selected air quantity is delivered at pressure greater than the pressure internal of the secondary reformer vessel.

SUMMARY OF THE INVENTION

It is a primary object of this invention to provide apparatus for reducing the hydrocarbon fuel requirement for a HABER ammonia synthesis apparatus, by supplying to the second reformer a supply of air for further combustion and heating of the gases in the second reformer, which apparatus includes means for mixing with the air a selected flow rate of combustible fuel, such as methane or natural gas, and steam, so that the energy required for elevating the temperature of the gases flowing into the second reformer can be provided from the additional flow of combustible fuel, such as methane or natural gas, rather than from the combustion of carbon monoxide and hydrogen previously prepared in the first reformer.

These and other objects are realized and the limitations of the prior art are overcome in this invention by providing a first cylindrical conduit of diameter D1 and a second cylindrical conduit of less diameter D2, coaxially positioned inside of the first conduit. The downstream end of the second conduit is closed and a plurality of circumferentially spaced orifices is provided in the wall of the second conduit, upstream of the closed end. Conventional means provided to supply air at a selected pressure P1 and flow rate, to the first annular space between the first and second conduits. Conventional means to supply at least a combustible fuel, such as methane or natural gas, at a pressure P2, greater than P1, to the second conduit, means to shield the radial flow of methane issuing from the orifices in the second conduit from the axial flow of air at high velocity along the annular space.

This invention pertains to means for addition of methane alone, or a mixture of methane and steam to the air stream, which is enroute to the secondary reformer air injection device. The methane added to the air stream can burn directly for secondary reformer gas temperature rise. This, at least partially, removes the necessity for $H_2$ and CO burning, and so reduces the total fuel fired per pound of ammonia which is synthesized.

This also covers means for preferred mixture of methane, or methane-steam with the air stream prior to the discharge of the air-methane, or air-methane-steam to the atmosphere internal of the secondary reformer vessel for fuel burning as described. It is to be understood that the temperature of the air stream as the methane, or methane-steam is delivered to the air stream is typically at 900F, which is well below the ignition temperature for methane; also, it is preferred that the volume of methane delivered to the air stream be less than 5% since this is the lower explosive limit for methane. If less than 5% of methane is delivered to the air, there is no danger of ignition at or after delivery.

Methane alone can be added to the air stream, but at the hazard of methane dissociation prior to burning, to cause carbon deposition on the secondary reformer catalyst, and retarded catalyst action, accordingly, but methane alone can be used. A greatly preferred alternative is to simultaneously inject equal volumes of steam and methane because the chemistry of burning is such that it is highly improbable carbon, alone, will be formed as the methane is burned. This apparatus will provide for either methane alone, or a steam-methane mixture to be delivered to the air stream upstream of the means for air entry to the secondary reformer interior atmosphere.

It is important that the methane be fully mixed with the air, so that there is no volume of the air in which the concentration of methane is higher than the lower explosive limit.

Because of the high axial flow of air in the annulus, the jets of methane may not reach the outer wall of the first annular space, because of the high velocity flow of air. Therefore, some means must be provided to shield the radial flow of the gas, from the transverse high velocity flow of air. One way of doing this is to provide tubular members placed over the orifices, that reach across the annular space, and have a plurality of orifices arrayed radially along the downstream surface of the tubular members.

Another, and more practical and preferred, method of providing the shielding for the jets of methane, involves welding rectangular radial bars aligned with each orifice and slightly upstream thereof, so that the air flow is forced to divide and flow around the two sides of the bars and provide a quiet eddy space on the downstream edge of the bars. The gas can flow uninterruptedly radially outwardly into this eddy space, and distribute itself across the full cross-section of the annular space, as it mixes with the air and flows downstream.

The optimum condition is to provide methane, and an equal quantity of steam to be mixed with the air. The stream is for the purpose of complete combustion of the methane, so that there will be no carbon residue remaining which can severely intefere with the operation of catalyst in the reformer. Thus, it is desirable to mix methane and steam prior to the injection of the mixture into the inner, or second conduit, which mixture then flows outwardly through the orifices to mix with the air.

Another embodiment of this invention would be to introduce inside of the second conduit a third coaxial conduit of still smaller diameter, which would be closed off at its downstream end, and would have a plurality of orifices of smaller diameter than those in the second circuit, but radially aligned, so that steam or methane applied to the third conduit would flow radially outwardly from the orifices in the third conduit to mix with the flow of methane or steam supplied to the annular space between the second and third conduits, and this combined flow of methane and steam would then flow radially outwardly from the orifices in the second conduit, being shielded by the radial bars, or other means, so as to mix uniformly over the entire area of the first annular space.

BRIEF DESCRIPTION OF THE DRAWINGS

These and other objects and advantages of this invention and a better understanding of the principles and details of the invention will be evident from the following description taken in conjunction with the appended drawings, in which FIGS. 1 and 2 illustrate, respectively, vertical section and transverse section of one embodiment of this invention.

FIG. 3 illustrates a further detail of the embodiment of FIGS. 1 and 2.

FIG. 4 illustrates in vertical cross-section another embodiment, comprising a modification of the embodiment of FIGS. 1 and 2.

FIG. 5 is a cross-sectional view taken across the plane 5—5 of FIG. 4.

FIG. 6 is a detailed view taken across the plane 6—6 of FIG. 4.

DESCRIPTION OF THE PREFERRED EMBODIMENT

Referring now to the drawings and, in particular, to FIGS. 1 and 2, there is shown one embodiment to the invention, indicated generally by the numeral 10. This comprises a first tubular conduit 12 of selected diameter, and an inner second tubular conduit 14 of less diameter than, and coaxial with, the first conduit 12. The second conduit 14 is closed off at its downstream end, and includes a plurality of N circumferentially spaced orifices 29 of selected diameter. Means are provided, such as by the conduit 16, which is passed through and welded to the larger first conduit 12, to supply gas indicated by arrows 26 to the inside of the second conduit 14, which flows outwardly as jets of gas 28 in a radial pattern from the orifices 29. Means are provided, but not shown, although well understood in the art, to supply air at selected temperature, pressure P1, and flow rate, to flow longitudinally along the inside of the first conduit 12 in accordance with arrows 32. This flow divides and flows 32 along the annular space between the first and second circuits, past the orifices 29.

Because of the high velocity of air in the annulus 35, in accordance with arrows 32, the radial jets 28 of gas from the second conduits will generally follow an arcuate path indicated as 28'. In other words, the radial flow will be diverted and the major portion of the gas will be slowed down and mixed with the air along the inner portion of the air flow, and only a minor portion of the gas will reach the outer conduit 12.

What is desired is to have a uniform mixture of methane with the air so that there will be no internal volumes where the concentration of methane is higher than the average over the whole annular area 35.

Consequently, it is necessary to have some means to shield the radial flow of gas 28 from the direct effect of the high velocity air. One way of doing this, as indicated in FIGS. 1 and 3, is to provide radial bars 30, one aligned with each of the orifices 29, extending substantially the full distance to the inner wall of the first conduit. The transverse width 75 of the bars 30 is greater than the diameter of the orifices 29, so that the bars provide an obstacle to flow 32 of the air, causing it to divide 32' and, as it flows past the bar 30, the recombine. However, in the process, there is a zone of still air or eddies in alignment with the orifices 29 so that the gas can flow along the entire radial length of the bar, mixing with the air flow 32' along the length of the bar so that there will be uniform mixing of the methane with the air over the full area of the annular space 35.

Another way of providing the means to shield the radial flow of gas would be to provide tubular means such as lengths of small diameter pipe welded to the outer surface of the second conduit 14, each one surrounding an orifice 29, and to provide a series of orifices on the downstream surface of these tubular means. However, the simplest construction, and one which is perfectly adequate, is to attach the bars as described and illustrated in FIGS. 1, 2, and 3, and that is the preferred embodiment of the means to shield the radial flow of gas.

Also shown on the inlet pipe or conduit 16, is a branch pipe 18. It is possible to flow methane in accordance with arrow 22 and steam in accordance with arrow 24, at substantially the same pressure and in selected flow rates, to mix in the conduit 16 and to flow in accordance with arrow 26, as a mixture of methane and steam out of the orifices 29, to be mixed with the air as previously described.

While the conduit 12 has been shown as terminating at the end 25, the flow of gas 33 is, of necessity, conducted by additional conduit to the second reformer of the HABER system, as is well-known. Arrows 33 indicate the mixture of gases 28 with the air 32 to provide the desired mixture in which the methane is matched with at least an equal amount of steam, and the resulting concentration of methane is below the lower explosive limit. Thus, when the air, methane and steam are forced into the second reformer, there will be burning of the methane to completion, because of the presence of the steam, and the resulting energy will provide the desired temperature elevation for the reacting gases, and, of course, will provide the necessary $N_2$.

Referring now to FIGS. 4, 5, and 6, there is shown another embodiment of the invention, indicated generally by the numeral 40. This embodiment includes a first conduit 42, which is similar to conduit 12 of FIG. 1, into which air is supplied in accordance with arrows 44. A second conduit 54, of lesser diameter, is mounted coaxially with the first conduit 42. This conduit 54 is closed off 58, 56 at its ends, and has a plurality of circumferentially-spaced orifices 68. Means are provided, including the opening 60 and the pipe 62, which passes through the wall of the conduit 42 and is welded thereto. Methane can be supplied in accordance with arrows 64 to the annular space 76 inside of the second conduit 54 so that it will flow radially outwardly in accordance with arrows 72.

FIG. 4 differs from FIG. 1, in that there is a third smaller concentric conduit 46 positioned within the second conduit 54 and is closed off 52 at its end. A plurality of orifices 66 are provided, equal in number to those in the second conduit 54, and radially aligned with those orifices. The orifices 66 in the third conduit 46 are of lesser diameter than the orifices 68 in the second conduit. The third conduit is supported by means such as the ell 47 and the pipe 48, which pass through the wall of the first conduit 42. Means, not shown, are provided to flow steam in accordance with arrows 50 down through the pipe 48 through the ell and through the third conduit 46 in accordance with arrow 50. This steam will flow out through the orifices 66 and radially outwardly in accordance with arrow 70 through the orifices 68 in the second conduit, thus mixing with the methane flowing in the annular space 76, has come from the conduit 62 in accordance with arrow 64.

The combined flow indicated by arrows 70 and 72 comprise the mixture of methane and steam. While it has been described with methane flowing in accordance with arrow 64 to the annular space 76 between the second and third conduits, with the steam flowing in accordance with arrows 50 into the third conduit 46, the gases could be interchanged and the methane flow into the third conduit 46 with steam flowing into the annular space 76 between the second and third conduits.

Indicated to FIG. 4, in dashed outline 80, is one of a plurality of bars, corresponding to those 30 in FIG. 1. which would be provided to maintain a shielding for the flow of gases 72 and 70, in a radial flow out into the annular space 82 between the first and second conduits.

FIG. 5 indicates a cross-section taken across the plane 5—5 of FIG. 4, which shows the two conduits, the second conduit 54 and the third conduit 46, each one having an equal number N of orifices 66 in the third conduit and 68 in the second conduit. The orifices 68 are larger than the orifices 66, as shown in FIG. 6 taken across the plane 6—6 of FIG. 4.

While the appearance of FIG. 4 is considerably different from that of FIG. 1, it can be thought of as a simple extension of FIG. 1 in this respect, that in FIG. 1 the two gases, methane and steam, are premixed through the two pipes 16 and 18 prior to flow into the second conduit 14, to be mixed with the air flowing into the annular space 35 between the second conduit and the first conduit. Considering the second conduit 54 to be the equal of 14 of FIG. 1, then FIG. 4 involves the introduction of a third conduit of still smaller diameter, than the second conduit, so that the mixture of steam and methane can be made as they flow through the two series orifices 66 and 68.

The flow arrows 64 and 50 do not carry a name since it is possible to make the methane flow in pipe 62 and the steam in pipe 48, or vice versa. It will be clear that the pressure of the methane and of the steam should be substantially equal and both should be higher than the pressure P1 in the first conduit, in the annular space 82 within the first conduit.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element or step thereof is entitled.

What is claimed is:

1. Apparatus for supply of gases to a secondary reformer of a HABER ammonia system, to reduce total hydrocarbon fuel requirement, comprising;
   (a) a first cylindrical conduit of diameter D1;
   (b) a second cylindrical conduit of diameter D2, less than D1, coaxial with and inside of said first conduit, forming a first annular space therebetween;
   (c) the downstream end of said second conduit closed and a plurality of circumferentially-spaced orifices of diameter K1 in the second conduit wall upstream of said closed end;
   (d) means to conduct a flow of air to said first conduit and at a selected pressure P1, temperature, and flow rate through said first annular space;
   (e) means for conducting a combustible fuel, such as methane or natural gas, at a pressure P2 greater than P1, to flow through said second conduit, and through said orifices, at a flow rate such that the resulting concentration of methane or natural gas in the air in said first annular space will be less than the lower explosive limit; and
   (f) including means to obstruct said air flow within said first annulus away from the radial flow path of said combustible fuel from said circumferentially-spaced orifices by a plurality of circumferentially-spaced radial bars attached to the outer surface of said second conduit upstream of said orifices and extending from the outer surface of said second conduit substantially to the inner surface of said first conduit, each of said bars aligned with one orifice;

whereby fuel from said orifices can, in the shadow of said radial bars, progress substantially across said first annular space, thus providing a more uniform mixture of fuel and air.

2. The apparatus as in claim 1 in which said radial bars are of greater width, in a direction along the axis of said second conduit, than their thickness.

3. The apparatus as in claim 2 in which the thickness of said radial bars is greater than the diameter of said orifices;

whereby the jets flowing from said orifices are not deflected by the flowing force of said air flow within said first annular space, when the axes of said orifices are perpendicular to the axis of said air flow.

4. Apparatus for supply of gases to a secondary reformer of a HABER ammonia system, to reduce total hydrocarbon fuel requirement, comprising;

(a) a first cylindrical conduit of diameter D1;

(b) a second cylindrical conduit of diameter D2, less than D1, coaxial with and inside of said first conduit, forming a first annular space therebetween;

(c) the upstream and downstream end of said second circuit closed and a plurality of circumferentially-spaced first orifices of diameter K1 in the second conduit wall upstream of said closed end;

(d) a third cylindrical coaxial conduit of diameter D3 less than D2, and inside of said second conduit, forming a second annular space between said second and third conduits, said second annular space closed off at its downstream end;

(e) a plurality of circumferentially-spaced second orifices in said third conduit of diameter K2, less than K1 and in radial alignment with said first orifices;

(f) means to supply steam at a pressure P3 greater than P1 to said third conduit;

(g) means to conduct a flow of air to said first conduit and at a selected pressure P1, termperature, and flow rate through said first annular space;

(h) means for conducting a combustible fuel, such as methane or natural gas, at a pressure P2 greater than P1, to flow through said second conduit, and through said first orifices, at a flow rate such that the resulting concentration of methane or natural gas in the air in said first annular space will be less than the lower explosive limit; and (i) including means to obstruct said air flow within said first annulus away from the radial flow path of said jets of fuel from said circumferentially-spaced orifices by a plurality of circumferentially-spaced radial bars attached to the outer surface of said second conduit upstream of said orifices and extending from the outer surface of said second conduit substantially to the inner surface of said first conduit, each of said bars aligned with one orifice;

whereby said jets of fuel from said first orifices can, in the shadow of said radial bars, progress substantially across said first annular space, thus providing a more uniform mixture of fuel and air.

* * * * *